(12) United States Patent
Shirakata et al.

(10) Patent No.: US 9,191,046 B2
(45) Date of Patent: Nov. 17, 2015

(54) RECEPTION DEVICE

(75) Inventors: Naganori Shirakata, Kanagawa (JP); Takenori Sakamoto, Kanagawa (JP); Naoya Yosoku, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/814,902

(22) PCT Filed: Feb. 7, 2012

(86) PCT No.: PCT/JP2012/000800
§ 371 (c)(1),
(2), (4) Date: Feb. 7, 2013

(87) PCT Pub. No.: WO2012/132191
PCT Pub. Date: Oct. 4, 2012

(65) Prior Publication Data
US 2013/0136165 A1 May 30, 2013

(30) Foreign Application Priority Data

Mar. 29, 2011 (JP) .................................. 2011-073446

(51) Int. Cl.
*H04B 1/10* (2006.01)
*H04L 25/02* (2006.01)
(Continued)

(52) U.S. Cl.
CPC ............ *H04B 1/1027* (2013.01); *H04L 25/022* (2013.01); *H04L 25/0224* (2013.01); *H04L 25/03159* (2013.01); *H04L 27/265* (2013.01); *H04L 27/2655* (2013.01); *H04L 27/2672* (2013.01); *H04L 27/2636* (2013.01);
(Continued)

(58) Field of Classification Search
USPC .................. 375/346, 260, 267, 348, 349, 350
See application file for complete search history.

(56) References Cited

U.S. PATENT DOCUMENTS

| 6,643,339 B1 * | 11/2003 | Okanoue et al. ............... 375/349 |
| 6,834,079 B1 * | 12/2004 | Strait et al. .................... 375/232 |
| 2003/0200243 A1 * | 10/2003 | Yomo et al. .................... 708/306 |

(Continued)

FOREIGN PATENT DOCUMENTS

| JP | 2006-245810 A | 9/2006 |
| JP | 4271235 B2 | 6/2009 |

(Continued)

OTHER PUBLICATIONS

Kuma et al., "A channel estimation scheme using short CHU sequence for overlap FDE," IEICE Technical Report RCS2008-54, Aug. 8, 2008, pp. 7-12.

(Continued)

*Primary Examiner* — Kabir A Timory
(74) *Attorney, Agent, or Firm* — Seed IP Law Group PLLC (57) ABSTRACT

An FFT unit subjects a P-times oversampling output of an AD converter to Fourier transform into a frequency domain signal. A distortion estimation unit estimates a distortion characteristic from a difference between the frequency domain signal and a reference signal. A correction coefficient calculation unit calculates a correction coefficient of a distortion characteristic. A correction unit corrects the frequency domain signal by using the correction coefficient. An IFFT unit subjects the corrected frequency domain signal to inverse Fourier into a time domain signal having the same sampling speed as a symbol speed, and outputs a partial time series.

8 Claims, 7 Drawing Sheets

(51) Int. Cl.
  *H04L 25/03* (2006.01)
  *H04L 27/26* (2006.01)
(52) U.S. Cl.
  CPC ......... *H04L27/2644* (2013.01); *H04L 27/2675* (2013.01); *H04L 2025/03414* (2013.01)

(56) References Cited

U.S. PATENT DOCUMENTS

| | | | |
|---|---|---|---|
| 2007/0009023 A1 | 1/2007 | Kimata et al. | |
| 2007/0133393 A1* | 6/2007 | Bocquet | 370/210 |
| 2007/0147529 A1 | 6/2007 | Bocquet | |

FOREIGN PATENT DOCUMENTS

| | | |
|---|---|---|
| JP | 4635750 B2 | 2/2011 |
| WO | 2007/015317 A1 | 2/2007 |

OTHER PUBLICATIONS

Obara et al., "Impact of Time-multiplexed Pilot-assisted Channel Estimation on SC-FDE in the Presence of Timing Offset," IEICE Technical Report SIP2009-110, RCS2009-244, Jan. 14, 2010, pp. 217-222.

Obara et al., "Performance Comparison of Overlap FDE and Inter-block Interference Cancellation for Single-carrier Transmission," IEICE Technical Report RCS 2010-252, Feb. 23, 2011, pp. 25-29.

Vaidyanathan et al., "Theory of Fractionally Spaced Cyclic-Prefix Equalizers," Acoustics, Speech and Signal Processing (ICASSP), 2002 IEEE International Conference on, IEEE, Apr. 13, 2002, 6 pages.

International Search Report, mailed Apr. 24, 2011, for International Application No. PCT/JP2012/000800, 2 pages.

\* cited by examiner

FIG. 7B $\varDelta t$

RECEPTION DEVICE

TECHNICAL FIELD

The present invention relates to a reception device that receives a signal modulated by using a single carrier transmission system.

BACKGROUND ART

In recent years, there has been studied a service that provides data including a variety of large-capacity contents using a high-definition moving image or a sound to an end user through a wireless communication.

In particular, in order to transmit large-volume data of several G (giga) bits at a high speed, there has been studied a wireless communication system that conducts high-speed transmission of several Gbps with the use of a millimeter waveband including a 60 GHz band. In the IEEE (Institute of Electrical and Electronics Engineers), a standardization work such as IEEE802.15.3c as a wireless PAN, or IEEE802.11ad as a wireless LAN is conducted.

For example, in a single carrier transmission system using a millimeter waveband which is studied in IEEE802.11ad, a signal that has been subjected to PSK or QAM modulation is transmitted at 1.76 G symbol/sec. One symbol time is shorter, that is, about 0.57 nsec. PSK modulation includes BPSK, QSPK, 8-PSK, and 16-PSK, and QAM modulation includes 16QAM, 64QAM, and 256QAM.

On the other hand, in the reception device that conducts a wireless communication in a millimeter waveband, a communication quality is deteriorated by multipath fading specific to the wireless communication even in a channel of a 60 GHz band. Even in a communication at a short distance (several tens cm to several m) in an indoor environment, a delay wave of several nsec to several tens nsec occurs due to reflection on a wall, a ceiling, furniture, a store fixture, or a surrounding human body. An inter-symbol interference occurs due to the delay wave which is several times to several tens times as long as the symbol time for transmission, resulting in a demodulation error.

As a countermeasure against a long delay, attention is paid to a frequency domain equalization system. There has been known that under the poor environments in which the delay wave longer than the symbol time is present, the amount of computation in a frequency domain equalizer is smaller than the amount of computation in a conventional general time domain equalizer.

As one of the wireless communication systems using the frequency domain equalization in the single carrier transmission system, an SC-FDE (single carrier with frequency domain equalization) system has been known (Patent Literatures 1 and 2).

In Patent Literature 1, a time-series portion longer than one block to be equalized is selected with respect to a time-series of a symbol, and converted into a frequency domain by Fourier transform (DFT or FFT, hereinafter referred to as "FFT") to conduct channel compensation processing. Further, after the portion that has been converted into the frequency domain has been converted into a time domain signal by inverse Fourier transform (IDFT or IFFT, hereinafter referred to as "IFFT"), the original time-series portion of one block is selected and output.

In Patent Literature 2, an oversampled signal with respect to the time series of the symbol is input, and a signal that is downsampled at a low oversampling rate is input to an FFT and an IFFT for filtering to conduct frequency domain equalization (FDE). On the other hand, in order to enhance a temporal resolution, a signal that is upsampled at a high oversampling rate is input to an FFT and an IFFT for channel estimation to conduct frequency domain equalization (FDE) to conduct FDE.

CITATION LIST

Patent Literatures

Patent Literature 1: Japanese Patent No. 4271235
Patent Literature 2: Japanese Patent No. 4635750

SUMMARY OF INVENTION

Technical Problem

However, the conventional reception device suffers from the following problems. In the above-mentioned communication technique, the time series of the symbol assumes an input signal in a state where synchronization is established. That is, it is assumed that a signal sampled at a signal determination timing of the input signal is the time series of the symbol. However, in the single carrier transmission system using the millimeter wave, as described above, since the symbol speed is ultrafast, the symbol synchronization with high precision in the time domain is difficult, resulting in such a problem that the circuit scale and the power consumption become large.

The present invention has been made in view of the above circumstances, and aims at providing a reception device that compensates symbol timing shift and the distortion of the symbol even when symbol synchronization in time domain processing is difficult because the symbol speed is high.

Solution to Problem

According to one aspect of the present invention, there is provided a reception device configured to receive a modulated transmit signal by using a single carrier transmission system, the reception device comprising: an AD converter configured to oversample a receive signal at a speed P times (P is an integer of 1 or more) as high as a symbol speed; a Fourier transform unit configured to select time domain signals of P×N points corresponding to N symbols from outputs of the AD converter, configured to subject the time domain signals of P×N points to Fourier transform into frequency domain signals of P×N points, and configured to output the frequency domain signals of N points corresponding to a receive signal bandwidth among the frequency domain signals of the P×N points; a distortion estimation unit configured to estimate a distortion characteristic or a phase error characteristic from a difference between frequency domain signals of first N points for calculating a correction coefficient among the frequency domain signals of N points output from the Fourier transform unit, and a frequency domain signal of a known reference signal by the reception device; a correction coefficient calculation unit configured to calculate a correction coefficient for correcting the distortion characteristic or the phase error characteristic; a correction unit configured to multiply frequency domain signals of second N points to be corrected in the distortion characteristic or the phase error characteristic among the frequency domain signals output from the Fourier transform unit by the correction coefficient to correct the frequency domain signals of the second N points; and an inverse Fourier transform unit configured to subject the corrected frequency domain signals of the second N points to inverse Fourier transform into time domain signals of the N points having the same sampling speed as the symbol speed, and configured to output a partial time series from the time domain signals of the N samples.

Advantageous Effects of Invention

According to the present invention, a receive signal is converted into a frequency domain by a block unit corresponding to N symbols to compensate the distortion characteristic of the channel and the sampling phase error. As a result, the symbol timing shift and the distortion of the symbol can be compensated without increasing the circuit scale.

BRIEF DESCRIPTION OF DRAWINGS

FIGS. 5A to 5E are graphs representing a signal within the equalization unit as a spectrum, in which

FIGS. 6A to 6E are graphs representing a signal within the equalization unit, in which

FIGS. 7A and 7B are timing charts representing a timing shift of a segment block by sampling frequency shift between transmission and reception, in which

DESCRIPTION OF EMBODIMENTS

A reception device according to an embodiment of the present invention will be described with reference to the drawings. The reception device according to this embodiment is applied to the reception device that receives a radio signal of a millimeter waveband.

Figure 3:
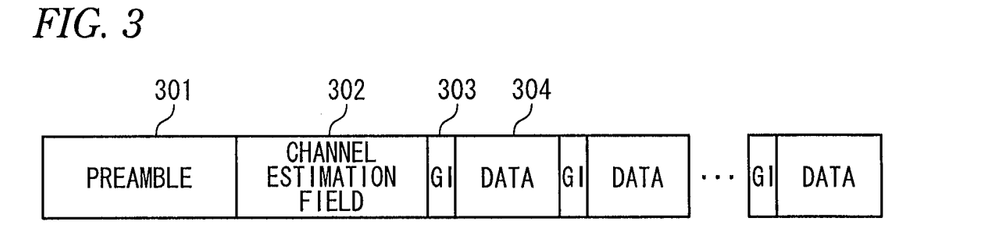
FIG. 3 is an illustrative view illustrating an example of a frame format of a transmit signal that is received by the reception device.

FIG. 3 is an illustrative view illustrating an example of a frame format of a transmit signal that is received by the reception device. The frame format of the transmit signal includes a preamble 301, a channel estimation field 302, a guard interval (GI) 303, and data 304.

The preamble 301 includes a signal waveform in which a known signal waveform is repeated by a plurality of times. For example, the preamble 301 uses a waveform obtained by repeating, by a plurality of times, a signal waveform in which a Golay code of 128 bits excellent in a correlation characteristic is subjected to BPSK modulation, as one unit. The reception device obtains repletion of the received known signal waveform by correlation detection, and the obtained repetition is used for at least one of, for example, the detection of a frame, a gain control, and a carrier frequency synchronization.

The channel estimation field 302 includes a plurality of known signal waveforms, similarly, and is used for the distortion estimation of the channel in the reception device according to the present invention. For example, the channel estimation field 302 uses a signal waveform in which the Golay code of 128 bits, and a complementary code of the Golay code of 128 bits are subjected to BPSK modulation.

The guard interval 303 is inserted as the separation of the data 304. Similarly, the guard interval 303 uses a known signal waveform, for example, a signal in which the Golay code of 64 bits is subjected to the BPSK modulation.

The data 304 includes a symbol string in which a data bit string that has been subjected to error correcting coding on a block basis is modulated by PSK or QAM modulation.

The symbol string of the transmit signal which has been subjected to the digital modulation by using the above-mentioned frame format (signal format) is filtered through a root-raised cosine filter as a transmission band limiting filter, and is then converted into an analog baseband signal by a DA converter. The baseband signal is converted into a single carrier radio frequency signal, power-amplified by the RF unit, and transmitted from an antenna.

Figure 2:
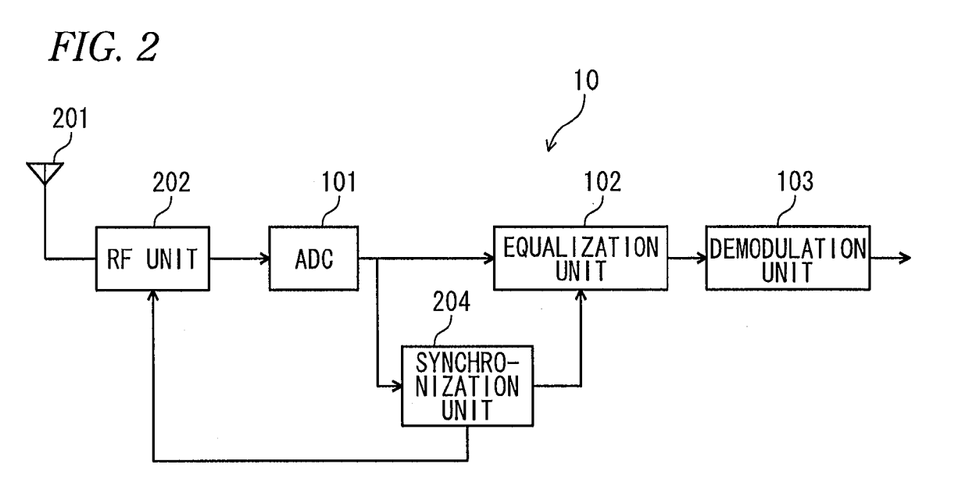
FIG. 2 is a block diagram illustrating an overall configuration of a reception device.

FIG. 2 is a block diagram illustrating an overall configuration of a reception device 10 according to the present invention. The reception device 10 includes an antenna 201, an RF unit 202, an ADC (AD converter) 101, a synchronization unit 204, an equalization unit 102, and a demodulation unit 103.

The RF unit 202 down-converts the single carrier radio frequency signal received by the antenna 201, into a baseband signal. The AD converter 101 samples the baseband signal, and converts the baseband signal into a digital signal.

The synchronization unit 204 conducts at least one synchronization processing of the detection of a frame, a gain adjustment of the RF unit 202, and a carrier frequency synchronization, by using the preamble 301 of the receive signal converted into the digital signal.

The equalization unit 102 estimates the distortion of the channel with the use of the channel estimation field 302 according to a frame timing detected by the synchronization unit 204. Further, the equalization unit 102 corrects the channel distortion characteristic and the sampling phase error characteristic in the data 304 subsequent to the channel estimation field 302 illustrated in FIG. 3, and outputs the symbol string.

The demodulation unit 103 receives the symbol string output by the equalization unit 102, determines a signal point, decodes data, and reproduces transmit data.

Figure 1:
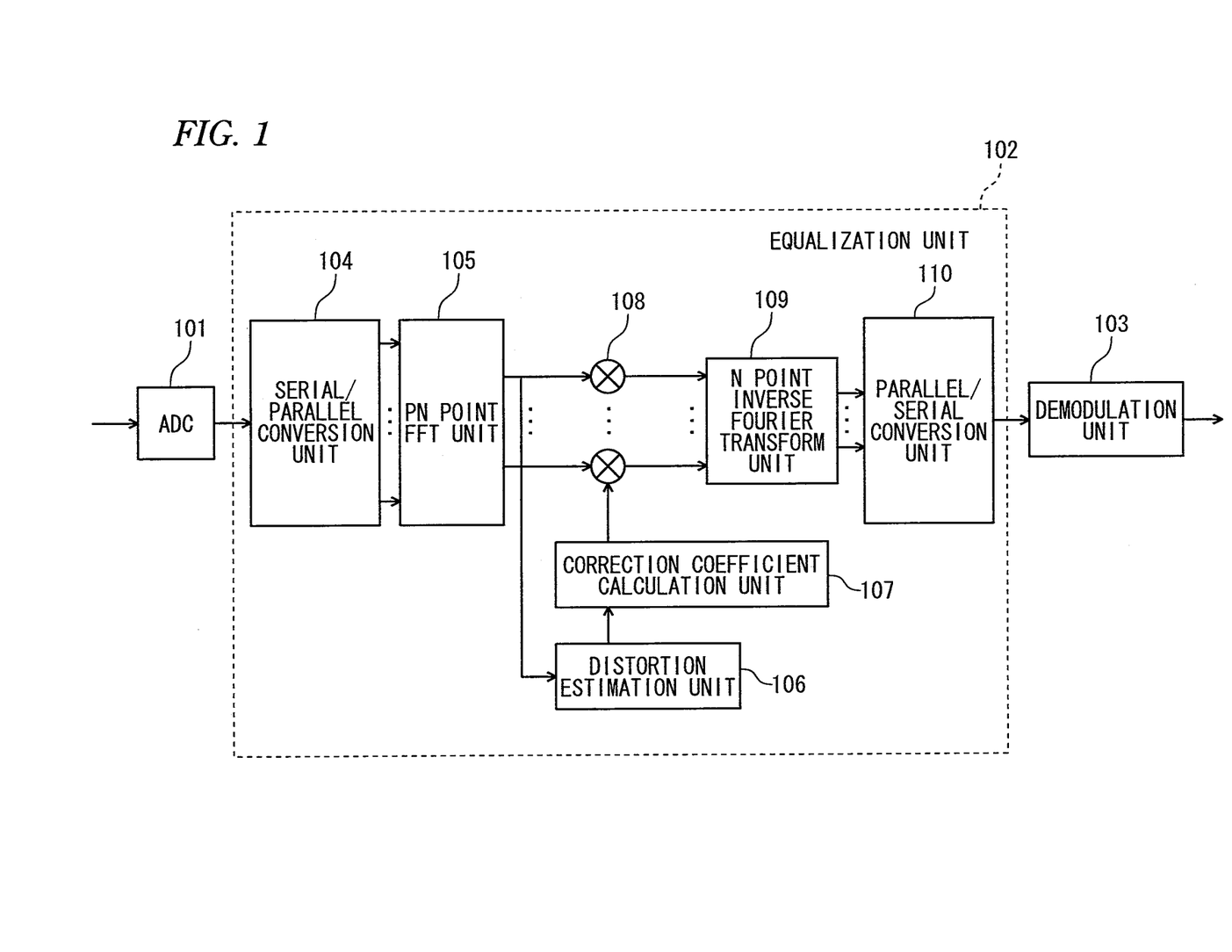
FIG. 1 is a block diagram illustrating an internal configuration of an equalization unit.

FIG. 1 is a block diagram illustrating an internal configuration of the equalization unit 102. The equalization unit 102 includes a serial/parallel (series parallel) conversion unit 104, a PN point Fourier transform unit (FFT unit) 105, a distortion estimation unit 106, and a correction coefficient calculation unit 107. The equalization unit 102 also includes a correction coefficient multiplication unit (correction unit) 108, an N point inverse Fourier transform unit (IFFT unit) 109, and a parallel/serial (parallel series) conversion unit 110.

The AD converter 101 oversamples the receive signal at a speed of P times (P>1) as high as the symbol speed, and subjects the receive signal to AD conversion.

The serial/parallel conversion unit 104 selects P×N sample points corresponding to the N symbols to be corrected, from the sample string that has been subjected to P-times oversampling, and converts the signals into parallel signals.

The PN point Fourier transform unit 105 subjects the signals of P×N sampling points, which have been converted into the parallel signals, to Fourier transform, and transforms the signals into the signals (complex vectors for each frequency bin) of the P×N points for each frequency domain (receive signal bandwidth). Among those transformed signals, frequency domain signals of the N points corresponding to the signal bandwidth are output.

When the channel estimation field 302 is input, the distortion estimation unit 106 estimates the distortion of the channel. Specifically, the distortion estimation unit 106 obtains, for each frequency bin, a differential vector between the frequency domain signals of the N points in the channel estimation field 302, which are output from the N point Fourier transform unit 105, and the frequency domain signals (first reference signal) in which the transmission waveform of the channel estimation field 302, which is held in advance, is subjected to the N point Fourier transform. The differential vector corresponds to the channel distortion characteristic.

The correction coefficient calculation unit 107 obtains a correction vector having the inverse characteristic of the distortion characteristic on the basis of the channel distortion characteristic estimated by the distortion estimation unit 106. Further, the correction coefficient calculation unit 107 may, in advance, obtain the frequency domain characteristic (receive filter characteristic) of the root-raised cosine filter as a reception band limiting filter, and weight the correction vector for each frequency bin.

When the guard interval (GI) 303 is input, the distortion estimation unit 106 obtains a difference vector between the frequency domain signal of the N points of the GI 303, which is output from the FFT unit 105, and a frequency domain signal (second reference signal) in which the transmission waveform of the GI 303 is subjected to N point Fourier transform, which is held in advance, for each frequency bin. The difference vector corresponds to a sampling phase shift characteristic (phase error characteristic).

When the difference vector, that is, the phase error characteristic is obtained, the channel distortion characteristic estimated in the channel estimation field 302 may be corrected. Alternatively, the distortion estimation unit 106 may obtain the phase error for each frequency bin corresponding to the sampling phase shift, and the correction coefficient calculation unit 107 may multiply the phase correction having the inverse characteristic of the phase error by the above-mentioned correction vector.

When the data 304 is input, the correction coefficient multiplication unit 108 multiplies the frequency domain signals of the N points, which are output from the FFT unit 105, by the correction vector output from the correction coefficient calculation unit 107 for each frequency bin, and corrects the distortion.

The N point inverse Fourier transform unit 109 subjects the frequency domain signals of the N points, which have been distortion-corrected by the correction coefficient multiplication unit 108, to inverse Fourier transform, and converts the signals into the time domain signals of N sample points. The distortion corrected frequency domain signals of the N points are converted into the time domain signals having the same sampling speed as the symbol speed.

The parallel/serial conversion unit 110 converts the time domain signals of N sample points (=N symbols) into serial signals. The parallel/serial conversion unit 110 outputs center partial sample strings from which the head and last several samples affected by waveform cutoff of the FFT and the IFFT are removed among N sample points, for example, the sample strings of the center N/2 sample points.

Because the N symbols (N sample points) to be corrected from the sample string input to the equalization unit 102 are input to the equalization unit 102 while being overlapped with each other by N/2 symbols, the continuity of the sample string output from the equalization unit 102 is held.

Figure 4:
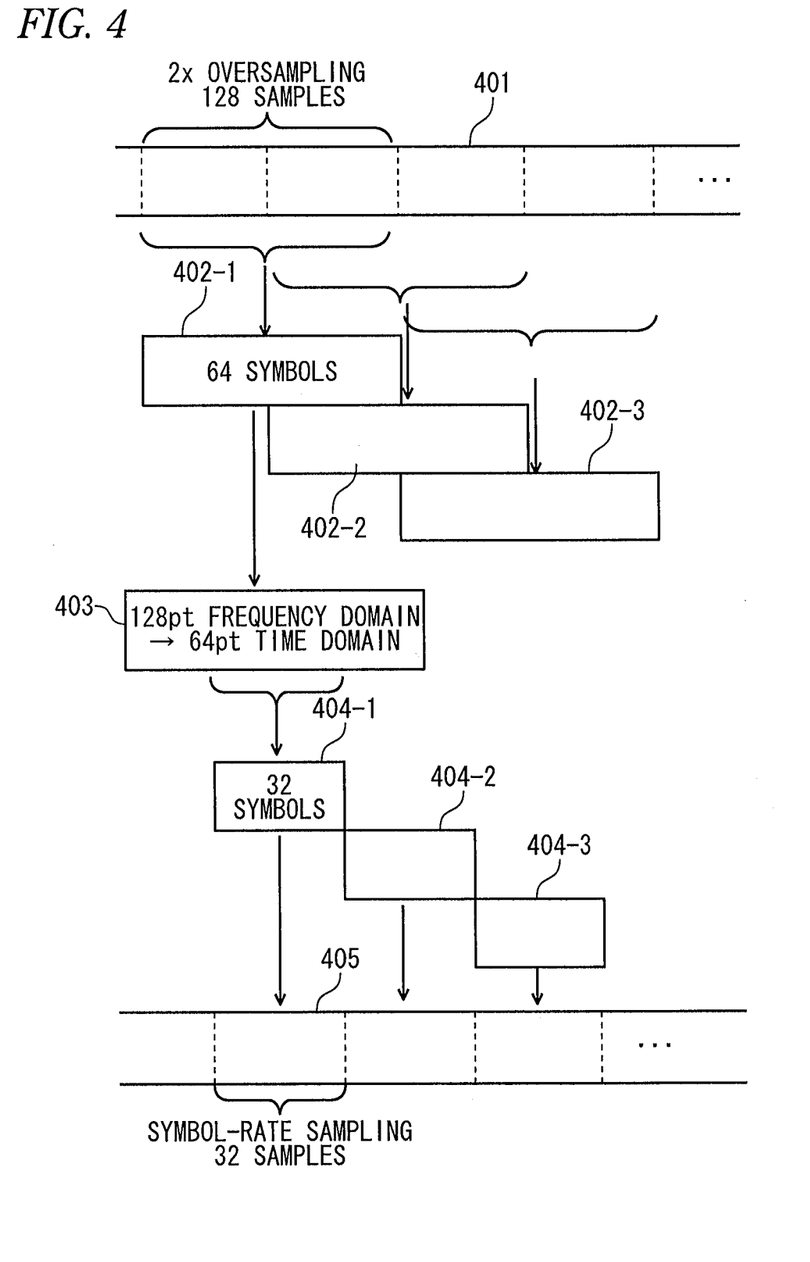
FIG. 4 is an illustrative view illustrating an example of a processing unit of a signal to be corrected.

FIG. 4 is an illustrative view illustrating an example of a processing unit of a signal to be corrected. In FIG. 4, an oversampled sample string 401 is input at a speed P=twice as high as the symbol speed. Also, a processing unit to be corrected is N=64 symbols.

The serial/parallel conversion unit 104 selects a sample string 402-1 of 128 sample points corresponding to 64 symbols from the sample string 401. The serial/parallel conversion unit 104 selects sample strings 402 (402-1, 402-2, 402-2) overlapped each other by N/2=32 symbols (N=64) as a processing unit.

The equalization unit 102 subjects the selected sample string 402-1 to 128 point Fourier transform and distortion correction, converts the sample string 402-1 into time domain signals 403 of 64 symbols (64 sample points) by the 64 point inverse Fourier transform.

The sample string 404-1 corresponding to 32 symbols (32 sample points) in the center portion is selected and output from the time domain signal 403. The sample strings 402-2 and 402-3 are processed in the same manner, and converted into the sample strings 404-2 and 404-3 (partial time series).

When those sample strings 402-1, 402-2, and 402-2 are coupled with each other, a sample (symbol) string 405 of the same-size sampling whose sample speed is equal to the symbol speed is output as the continuity is kept.

Subsequently, the distortion correction in the equalization unit 102 will be described.

FIG. 5 is a graph representing a signal within the equalization unit 102 as a spectrum. In FIGS. 5A to 5E, the axis of abscissa represents a frequency or a frequency bin, and the axis of ordinate represents a signal power.

Figure 5A:
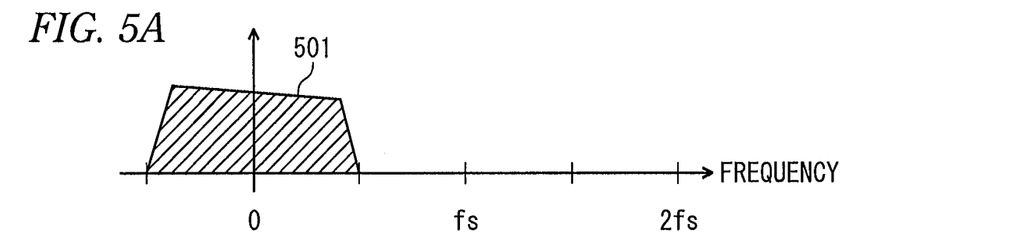
FIG. 5A is a spectrum of an analog baseband signal input to an AD converter.

FIG. 5A illustrates a spectrum 501 of the analog baseband signal input to the AD converter 101. In this example, the baseband signal is a complex signal, and it is assumed that the symbol speed is fs(Hz). The spectrum 501 of the analog baseband signal which is an input signal is a spectrum having a bandwidth fs (Hz) centered on the DC component (0 Hz).

Figure 5B:
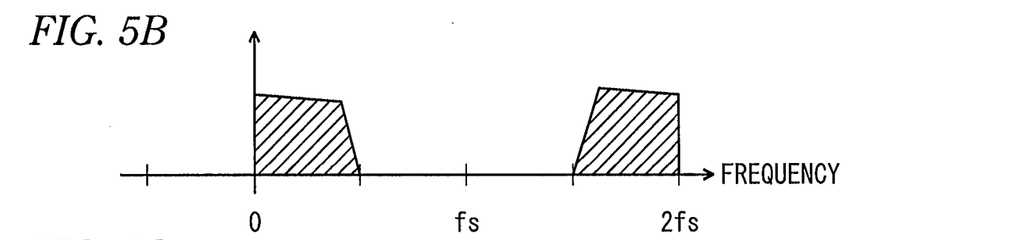
FIG. 5B is a spectrum of a signal that has been oversampled with P=twice by an AD converter.

FIG. 5B illustrates a spectrum of a signal in which the input signal has been oversampled with P=twice by the AD converter 101. Since the sampling speed is 2 fs (Hz), aliasing occurs centering around fs (Hz).

Figure 5C:
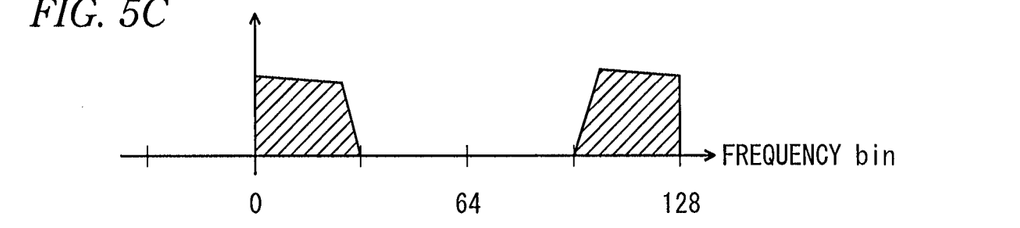
FIG. 5C is a spectrum of a signal that has been converted into a frequency domain signal by a 128 point FFT.

FIG. 5C illustrates a spectrum of a signal in which the sample string has been converted into the frequency domain signal by the 128 point FFT. The axis of abscissa is the frequency bin (k=0 to 127) in which 2 fs (Hz) is discretized to 128 points. The signal bandwidth depends on the frequency bin of k=0 to 31, and the frequency bin of k=96 to 127.

Figure 5D:
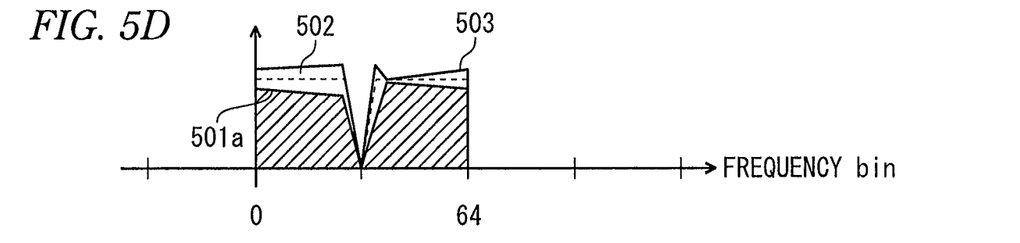
FIG. 5D is a spectrum of a signal in which a frequency bin for 64 points corresponding to a signal bandwidth is extracted from a spectrum of a signal that has been converted into the frequency domain signal by the 128 point FFT.

FIG. 5D illustrates a spectrum of a signal in which the frequency bin for 64 points corresponding to the signal bandwidth is extracted from the spectrum of the signal that has been converted into the frequency domain signal by the 128 point FFT. As described above, a difference between the spectrum 501a of the signal and a frequency characteristic 502 (dotted line) of a reference signal is obtained by the distortion estimation unit 106, and a correction coefficient 503 that corrects the difference is obtained by the correction coefficient calculation unit 107.

Figure 5E:
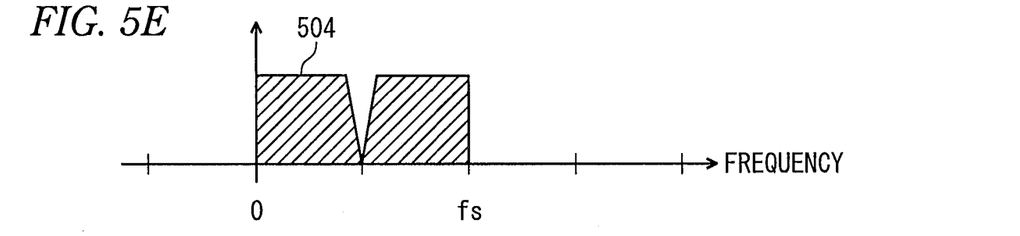
FIG. 5E is a spectrum of a signal in which distortion has been corrected.

As a result of multiplying the respective frequencies bin of the signals by the correction coefficient 503, a spectrum 504 whose distortion has been corrected is obtained as illustrated in FIG. 5E. The spectrum 504 is converted into the time domain signal in the 64 point IFFT, and output as an equalized signal.

A distortion correction will be described with the use of mathematical expressions.

It is assumed that a transmit signal is x(t), a receive signal is r(t), and a channel characteristic between a transmission device and the reception device is h(t). When it is assumed that values obtained by subjecting x(t), r(t), and h(t) to Fourier transform are X(f), R(f), and H(f), Expression (1) is obtained.

[Ex. 1]

$$R(f)=X(f)\times H(f) \quad (1)$$

When it is assumed that a channel estimation symbol is x_ref(f), a value obtained by subjecting the channel estimation symbol to Fourier transform is X_ref(f), the received channel estimation symbol is r_ref(t), and a value obtained by subjecting the received channel estimation symbol to Fourier transform is R_ref(f), a channel characteristic H(f) is obtained by Expression (2). The Fourier transformed value R_ref(f) of the channel estimation symbol corresponds to the frequency characteristic 502 (refer to FIG. 5D) of the reference signal.

[Ex. 2]

$$H(f)=R\_ref(f)/X\_ref(f) \quad (2)$$

When it is assumed that the transmitted data symbol is x_data(t), a value obtained by subjecting the transmitted data symbol to Fourier transform is X_data(f), the received data symbol is r_data(t), and a value obtained by subjecting the received data symbol to Fourier transform is R_data(f), Expression (3) is obtained.

[Ex. 3]

$$R\_data(f)=H'(f)\times X\_data(f) \quad (3)$$

In this example, if the channel characteristic H(f) estimated by the channel estimation symbol is equal to a channel characteristic H'(f) at the time of receiving the data symbol, the reception device 10 can reproduce a transmission data symbol according to Expression (4). That is, the reproduced transmit data symbol X'_data(f) is obtained by multiplying the value R_data(f) obtained by subjecting the received data symbol to Fourier transform by a correction coefficient 1/H(f). The correction coefficient 1/H(f) corresponds to the correction coefficient 503 (refer to FIG. 5D).

[Ex. 4]

$$X'\_data(f)=R\_data(f)\times 1/H(f) \quad (4)$$

Subsequently, a description will be given of a sampling timing shift correction in the equalization unit 102.

FIGS. 6A to 6E are graphs representing a signal within the equalization unit 102. In FIGS. 6A to 6E except for FIG. 6D, the axis of abscissa represents a time axis, and the axis of ordinate represents a phase difference.

FIGS. 6A to 6E illustrates a signal point 601 of transmission, and a signal point 602 reproduced by the equalization unit 102. Also, the signal point 601 of transmission is subjected to BPSK modulation by a symbol speed fs (Hz), that is, a symbol interval 1/fs (sec).

Figure 6A:
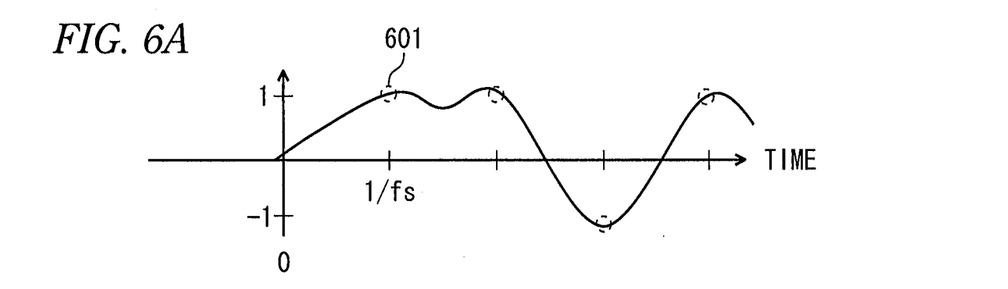
FIG. 6A is an analog baseband signal waveform.

The bandwidth is limited by a bandwidth limit filter (for example, root-raised cosine filter) during transmission, and the transmit signal is transmitted as an analog baseband signal waveform indicated by a solid line of FIG. 6A.

Figure 6B:
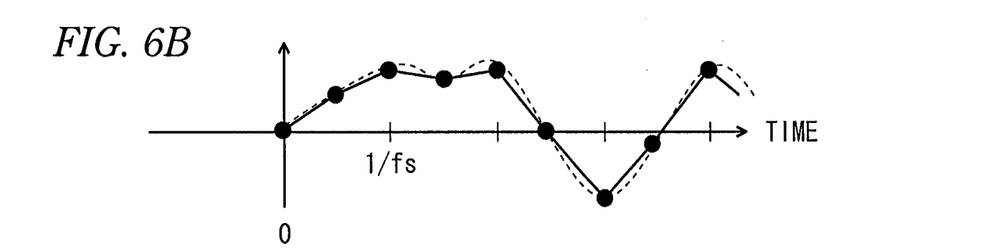
FIG. 6B is a case in which a timing (symbol timing) of a transmit signal point matches a sampling timing.

FIG. 6B illustrates a sample string (black point) in which the AD converter 101 samples the input signal (dotted line) at the oversampling timing of P=twice (that is, every ½ fs). FIG. 6B illustrates a case in which the timing (symbol timing) of the transmit signal point matches the sampling timing.

Figure 6C:
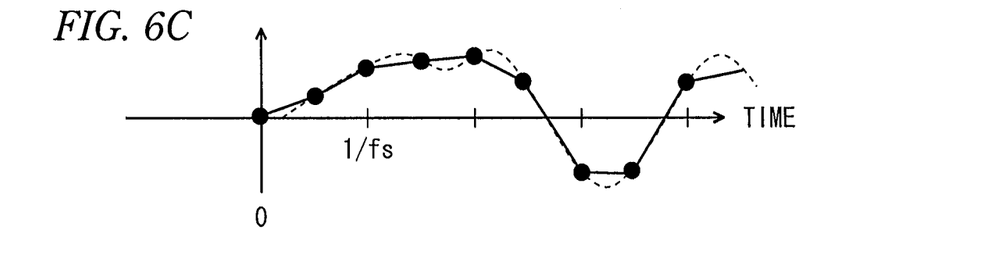
FIG. 6C is a case in which a phase of the sampling timing is shifted from the symbol timing.

On the other hand, FIG. 6C illustrates a case in which the phase of the sampling timing is shifted from the symbol timing.

Figure 6D:
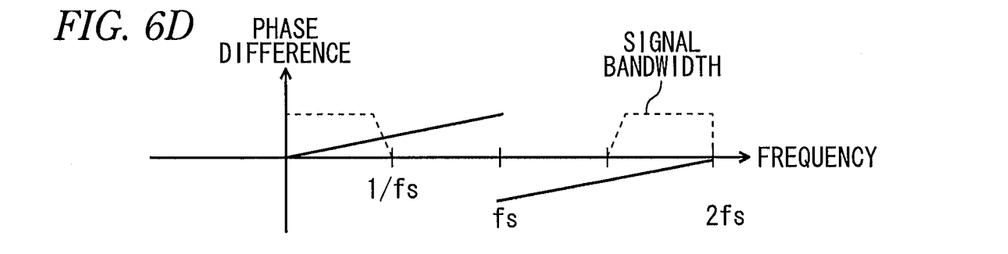
FIG. 6D is a sampling phase difference detected as a phase rotation proportional to frequency.

In FIGS. 6B and 6C, when the sampled signal is converted into the frequency domain to detect a phase difference for each frequency bin, the sampling phase difference can be detected as a phase rotation proportional to the frequency as illustrated in FIG. 6D.

For example, the correction coefficient calculation unit 107 linearly approximates a residual phase error for each frequency bin when the distortion of the signal of the guard interval 303, which is a known signal, is corrected, on the basis of the phase of the complex vector for each frequency bin in the reference signal (refer to FIG. 5B) (refer to FIG. 6D).

Figure 6E:
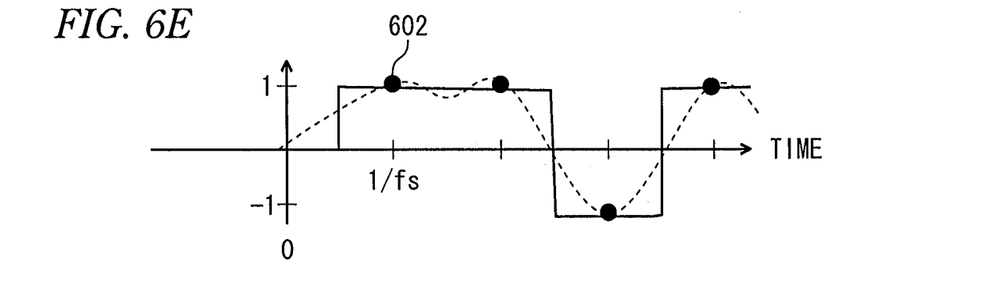
FIG. 6E is a receive bit string.

In order to cancel the residual phase error, the correction coefficient calculation unit 107 conducts correction to effect inverse rotation, whereby the sampling timing when the signal is converted into the time domain signal can match the symbol timing (refer to FIG. 6E).

In FIG. 6E, the input signal illustrated in FIG. 6C is converted into the time domain signal after the phase rotation has been corrected as illustrated in FIG. 6D. As a result, the transmit signal point is reproduced at the symbol timing (1/fs interval) (refer to reproduced signal point 602). The reproduce signal is determined by the demodulation unit 103 to obtain the receive bit string indicated by a solid line of FIG. 6E.

Now, a sampling timing shift correction will be described with reference to Mathematical Expressions.

Figure 7A:
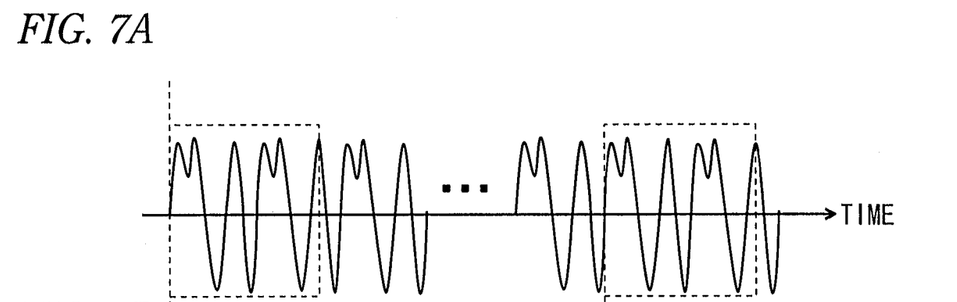
FIG. 7A is a case in which the sampling frequency shift is not present.
Figure 7B:
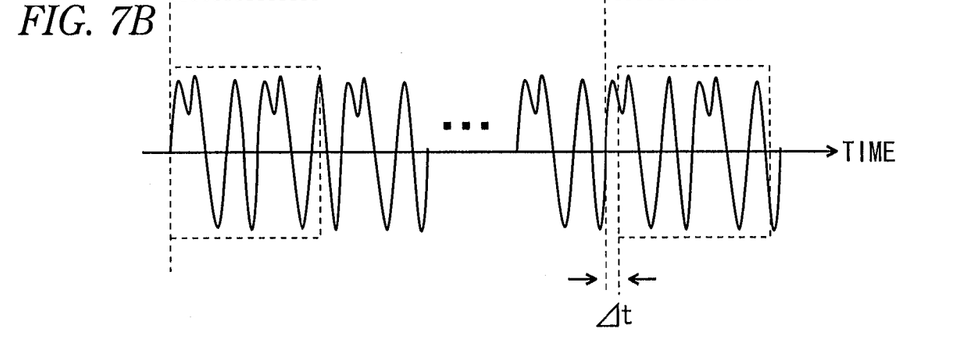
FIG. 7B is a case in which the sampling frequency shift is present.

When a sampling clock frequency is shifted between transmission and reception, a segment block period (FFT window) to be subjected to the Fourier transform is gradually shifted with respect to the transmit signal in the reception device 10. FIGS. 7A and 7B are timing charts representing a timing shift of the segment block by the sampling frequency shift between transmission and reception.

FIG. 7A illustrates a case in which no sampling frequency shift is present, and FIG. 7B a case in which the sampling frequency shift is present. A timing shift Δt of the segment block occurs as the shift of the sampling frequency.

As illustrated in FIGS. 6B and 6C, the sample phase is shifted within the block with the result that, as illustrated in FIG. 6D, phase rotation proportional to the frequency bin occurs in the signal converted into the frequency domain.

A value R'(f) obtained by subjecting the phase rotated receive signal to Fourier transform is represented by Expression (5). In this example, a parameter N represents FFT point number (the number of samples in a block). A parameter f represents the frequency bin. A parameter Δt represents the timing shift of the segment block.

[Ex. 5]

$$R'(f)=H(f)X(f)\exp(-j2\pi f\Delta t/N) \quad (5)$$

A timing shift Δt of the segment block occurs in the transmit signal between the segment of the channel estimation symbol and the segment of the data symbol, resulting in the occurrence of the following event.

Specifically, even if a value R'_data(f) obtained by subjecting the receive signal of the above-mentioned data symbol to Fourier transform is divided by the channel characteristic H(f) estimated by the channel estimation symbol to equalize the frequency domain, a term of the phase rotation in each frequency attributable to the timing shift Δt of the segment block remains as represented by Expression (6).

[Ex. 6]

$$R'\_data(f)/H(f) = X'\_data(f)\exp(-j2\pi f \Delta t/N) \quad (6)$$

In this example, it is assumed that the guard interval 303 inserted into the partial portion as the known code is x_gi(t), and a value obtained by subjecting the guard interval 303 to Fourier transform is X_gi(f). The guard interval 303 is divided by the channel characteristic H(f) and Xgi(f) to estimate a phase rotation θ(f) caused by the timing shift Δt of the segment block as represented by Expression (7).

[Ex. 7]

$$\begin{aligned}\vartheta(f) &= R'\_gi(f)/H(f)/X\_gi(f) \\ &= X\_gi(f)\exp(-j2\pi f \Delta t/N)/X\_gi(f) \\ &= \exp(-j2\pi f \Delta t/N)\end{aligned} \quad (7)$$

Hence, the correction coefficient calculation unit 107 can obtain an inverse characteristic 1/θ(f) for canceling the phase rotation θ(f) as represented by Expression (8).

[Ex. 8]

$$\theta(f) = \exp(-j2\pi f \Delta t/N) \quad (8)$$

As a result, when the channel characteristic H(f) is corrected, a channel characteristic H"(f) whose timing shift Δt has been corrected is represented by Expression (9).

[Ex. 9]

$$H''(f) = H(f)/\theta(f) \quad (9)$$

Because the subsequent data symbol is equalized by the corrected channel characteristic H"(f), the equalization unit 102 can reproduce the transmit data symbol. The reproduced data symbol is represented by Expression (10).

[Ex. 10]

$$R''\_data(f)/H''(f) = H(f)X'\_data(f)\exp(-j2\pi f \Delta t/N)/H(f)$$
$$\exp(-j2\pi f \Delta t/N) = X'\_data(f) \quad (10)$$

According to the reception device of this embodiment, the receive signal is converted into the frequency domain by the block unit corresponding to N symbols to compensate the distortion characteristic of the channel and the sampling phase error. As a result, the symbol timing shift and distortion can be corrected without increasing the circuit scale.

Accordingly, even if the symbol synchronization in the time domain requiring high-speed calculation for each sample is not used, that is, the symbol synchronization caused by the time domain processing is difficult because the symbol speed is high, the symbol timing shift can be compensated.

Although the embodiments have been described thus far by reference to the drawings, the invention is, needless to say, not confined to the embodiments. It is manifest that the persons skilled in the art can conceive various alterations or modifications of the embodiments within a category described in connection with the claims and that the alterations or modifications naturally fall within a technical scope of the invention.

Further, respective function blocks used in the description of the embodiments may be typically realized by an LSI that is an integrated circuit. They may be individually fabricated into one chip or a part or the whole of them may be fabricated into one chip. Here, although LSI is exemplified, it may be called an IC, a system LSI, a super LSI, an ultra LSI, or the like, depending on the difference in integrity.

Further, the technique for the integrated circuit is not limited to LSI, and may be realized as a dedicated circuit or a general purpose processor. After the LSI fabrication, a FPGA (Field Programmable Gate array) that can be programmed after fabrication of the LSI or a reconfigurable processor that can reconfigure the connection or setting of the circuit cells in the LSI may be used.

Also, the calculation of those functional blocks can be calculated by using, for example, a DSP and a CPU. Further, those processing steps can be recorded in a recording medium as a program, and executed.

Further, if a technique for integrated circuit to be replaced by an LSI appears due to the advance of the semiconductor technology or another technology deviated therefrom, the functional block may be integrated by using the another technology.

This application is based on Japanese Patent Application (Japanese Patent Application No. 2011-073446) filed on Mar. 29, 2011, the disclosure of which is incorporated herein by reference in its entirety.

INDUSTRIAL APPLICABILITY

The present invention can be widely applied to overall radio communication apparatuses including mobile communications requiring a small circuit scale and a low power consumption.

REFERENCE SIGNS LIST

10, reception device
101, AD converter
102, equalization unit
103, demodulation unit
104, serial/parallel conversion unit
105, PN point Fourier transform unit (FFT unit)
106, distortion estimation unit
107, correction coefficient calculation unit
108, correction coefficient multiplication unit
109, N point inverse Fourier transform unit (IFFT unit)
110, parallel/serial conversion unit
201, antenna
202, RF unit
204, synchronization unit
301, preamble
302, channel estimation field
303, guard interval
304, data
401, 402-1, 402-2, 402-3, sample string
403, time domain signal
404-1, 404-2, 404-3, 405, sample string
501, spectrum of baseband signal
501a, frequency characteristic of signal
502, frequency characteristic of reference signal
503, correction coefficient
504, spectrum
601, signal point of transmission
602, reproduced signal point

The invention claimed is:

1. A reception device configured to receive a modulated transmit signal by using a single carrier transmission system, the reception device comprising:
   an AD converter configured to oversample a reception signal at a speed P times (P is an integer greater than 1) as high as a symbol speed, the oversampled reception signal including a channel estimation field and a periodic guard interval;
   a Fourier transformer configured to:
      select time domain signals of P×N points, corresponding to N symbols of the reception signal, from the oversampled reception signal including the channel estimation field and the periodic guard interval, the time domain signals of P×N points overlapping by a determined number of symbols;
      subject the time domain signals of P×N points to Fourier transform into frequency domain signals of P×N points; and
      output the frequency domain signals of N points corresponding to a reception signal bandwidth among the frequency domain signals of the P×N points, wherein a number of frequency domain signals (N) output by the Fourier transformer is less than a number of time domain signals (P×N) transformed by the Fourier transformer;
   a distortion estimator configured to estimate a distortion characteristic and a phase error characteristic respectively proportional to frequency from a difference between frequency domain signals of first N points for calculating a correction coefficient among the frequency domain signals of N points output from the Fourier transformer, and a frequency domain signal of the channel estimation field and the periodic guard interval respectively;
   a correction coefficient calculator configured to calculate correction coefficients for correcting the distortion characteristic and for correcting the phase error characteristic, the correction coefficients for correcting the phase error characteristic corresponding to inverse rotation of a linear approximation of a residual phase error when the distortion characteristic in the periodic guard interval is corrected, in accordance to a phase of a complex vector for each frequency bin in a reference signal, which is held in advance in the reception device and is a same signal as the periodic guard interval;
   a corrector configured to multiply frequency domain signals of second N points to be corrected in the distortion characteristic and the phase error characteristic among the frequency domain signals output from the Fourier transform unit by the correction coefficients to correct the frequency domain signals of the second N points; and
   an inverse Fourier transformer configured to subject the corrected frequency domain signals of the second N points to inverse Fourier transform into time domain signals of the N points having the same sampling speed as the symbol speed, and configured to output a partial time series from the time domain signals of the N samples, the phase error correction matching the sampling speed when the signals are converted into the time domain to the symbol timing.

2. The reception device according to claim 1, wherein the correction coefficient calculator is configured to calculate a correction coefficient for correcting a receive filter characteristic in addition to the inverse characteristic of the distortion characteristic and the phase error characteristic.

3. The reception device according to claim 1, wherein the reception signal has a signal format including a preamble, a channel estimation field, the guard interval, and a data field.

4. The reception device of claim 1 wherein the determined number of symbols is N/2 symbols.

5. A reception device, comprising:
   an AD converter, which, in operation, oversamples a reception signal of a single carrier transmission system at a speed P times (P is an integer greater than 1) as high as a symbol speed, the oversampled reception signal including a channel estimation field and a periodic guard interval; and
   signal processing circuitry, which, in operation:
      selects time domain signals of P×N points, corresponding to N symbols of the reception signal, from the oversampled reception signal including the channel estimation field and the periodic guard interval, the time domain signals of P×N points overlapping by a determined number of symbols;
      subjects the time domain signals of P×N points to Fourier transform into frequency domain signals of P×N points;
      outputs the frequency domain signals of N points corresponding to a reception signal bandwidth among the frequency domain signals of the P×N points, wherein a number of frequency domain signals (N) output by the Fourier transformer is less than a number of time domain signals (P×N) transformed by the Fourier transformer;
      estimates a distortion characteristic and a phase error characteristic respectively proportional to frequency from a difference between frequency domain signals of first N points for calculating a correction coefficient among the frequency domain signals of N points output from the Fourier transformer, and a frequency domain signal of the channel estimation field and the periodic guard interval respectively;
      determines correction coefficients to correct the distortion characteristic and the phase error characteristic, the correction coefficients to correct the phase error characteristic corresponding to inverse rotation of a linear approximation of a residual phase error when the distortion characteristic in the periodic guard interval is corrected, in accordance to a phase of a complex vector for each frequency bin in a reference signal, which is held in advance in the reception device and is a same signal as the periodic guard interval;
      multiplies frequency domain signals of second N points to be corrected in the distortion characteristic and the phase error characteristic among the frequency domain signals output from the Fourier transform unit by the correction coefficients to correct the frequency domain signals of the second N points; and
      subjects the corrected frequency domain signals of the second N points to inverse Fourier transform into time domain signals of the N points having the same sampling speed as the symbol speed, and configured to output a partial time series from the time domain signals of the N samples, the phase error correction matching the sampling speed when the signals are converted into the time domain to the symbol timing.

6. The reception device according to claim 5 wherein the signal processing circuitry, in operation, determines a correction coefficient to correct a receive filter characteristic.

7. The reception device according to claim 5 wherein the reception signal has a signal format including a preamble, the channel estimation field, the guard interval, and a data field.

8. The reception device of claim 5 wherein the determined number of symbols is N/2 symbols.

* * * * *